United States Patent [19]
King

[11] 3,708,245
[45] Jan. 2, 1973

[54] HOT OIL LEAK DETECTION
[75] Inventor: Samuel F. King, Oklahoma City, Okla.
[73] Assignee: Mobil Oil Corporation
[22] Filed: July 31, 1970
[21] Appl. No.: 59,958

[52] U.S. Cl. .................................. 417/13, 417/44
[51] Int. Cl. .................................. F04b 49/10
[58] Field of Search ..... 417/13, 32; 116/114.5; 277/2

[56]        References Cited
       UNITED STATES PATENTS

| | | | |
|---|---|---|---|
| 2,769,395 | 11/1956 | Olson, Jr. | 417/9 |
| 3,398,690 | 8/1968 | Deaton | 417/32 |
| 2,915,975 | 12/1959 | Kittrell et al. | 417/9 |
| 2,972,132 | 2/1961 | Putney | 340/229 |
| 2,731,282 | 1/1956 | McManus et al. | 277/2 |
| 3,209,830 | 10/1965 | Orr et al. | 277/2 |
| 3,312,064 | 4/1967 | Dickinson et al. | 277/2 |
| 3,375,015 | 3/1968 | Swearingen | 277/2 |
| 3,392,983 | 7/1968 | Hajner | 277/2 |
| 3,401,666 | 9/1968 | Munroe | 116/114.5 |

FOREIGN PATENTS OR APPLICATIONS 505,391   5/1939   Great Britain .................. 417/45

Primary Examiner—William L. Freeh
Attorney—William J. Scherback, Frederick E. Dumoulin, William D. Jackson, Henry L. Ehrlich, Andrew L. Gaboriault and Sidney A. Johnson

[57]          ABSTRACT

This specification discloses a method and apparatus for pumping hot fluids and for detecting leaks of the hot fluids. An application of this invention is in hot oil pumps of gasoline absorption plants. Detection of leaks of hot oil due to pump seal failure is sensed and a signal is produced. This signal may be used for such things as shutting down the pump and giving an alarm.

13 Claims, 1 Drawing Figure

PATENTED JAN 2 1973　　　　　　　　　　　　　　3,708,245
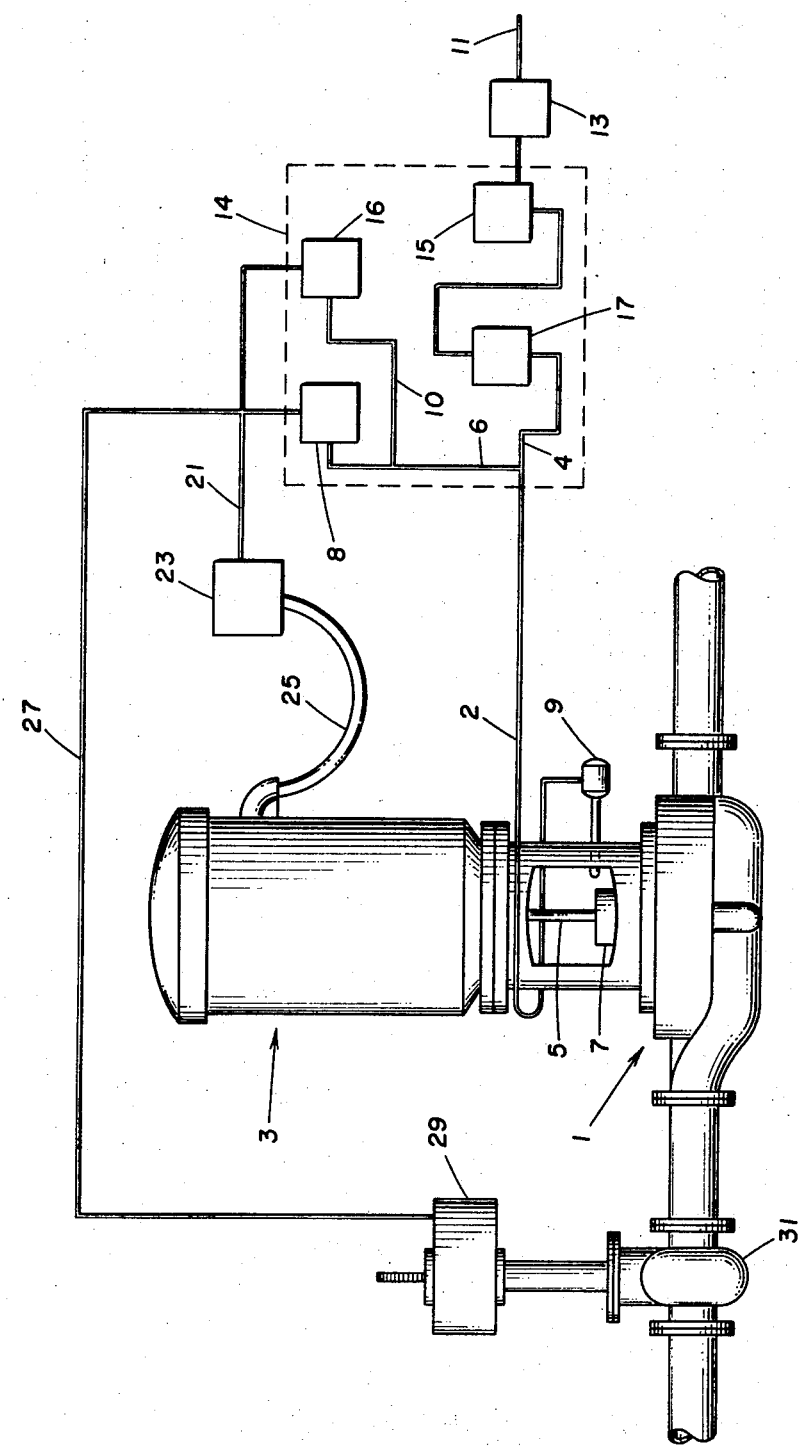
SAMUEL F. KING
INVENTOR
BY [signature]
ATTORNEY

HOT OIL LEAK DETECTION

BACKGROUND OF THE INVENTION

This invention concerns detection of leaks due to seal failure in pumps which handle fluids.

In industrial processes such as in gasoline absorption plants, it is necessary to pump fluid under high pressure and temperature. Pumps for handling such fluid have seals about the piston rods or pump shaft and seal failure will allow these hot fluids to be leaked from the pumps. Where these fluids are flammable, as in the case of gasoline plants, such leaks are particularly hazardous to both equipment and personnel. Fires have originated from such leaks in gasoline plants and completely destroyed the plants.

Various systems have been devised for preventing these leaks. One such system involves the use of tandem seals, that is, two seals about the pump shaft so that if one seal fails there is still another seal which contains the fluids in the pump and prevents leakage thereof. However, converting pumps having only one seal to provide tandem seals is a very expensive process which requires both shut-down of the plant and modification of the existing pumps. Even in pumps having tandem seals, a problem exists in the detection of the failure of one seal only. One method of detecting failure of the inside seal is by monitoring the pressure intermediate the tandem seals in the annulus surrounding the pump shaft. This pressure is normally much below the working pressure of the pump. When the inside seal fails, the pressure increases and detection of this pressure increase has been used to indicate the failure of the inside seal.

SUMMARY OF THE INVENTION

This invention relates to a fluid pump for handling high temperature fluids. The pump has a shaft passing through a pump seal and a pneumatic temperature sensing means positioned adjacent the seal for producing a pressure signal in response to a specified temperature. The temperature sensor is connected through a tubing to a means for controlling the pump in response to a pressure signal. In operation, a leak of hot fluids from the pump is detected by the temperature sensor and the pneumatic pressure in the tubing is lowered. This lowering of pressure activates the means for controlling the pump.

In a preferred embodiment of this invention, a fail-safe system is provided by utilizing tubing having a relatively low melting point and locating at least a portion of this tubing in the path which fluid leaking from the seal would take. In case of seal failure, the hot fluid escaping from the pump melts the tubing thereby producing a drop in pressure in the tubing. This pressure drop operates the switch means to generate a signal.

BRIEF DESCRIPTION OF THE DRAWING

The drawing is a schematic view of a vertical pump equipped with a pump seal failure detection system.

DESCRIPTION OF THE PREFERRED EMBODIMENTS

In accordance with this invention, a fluid pump is equipped with a pneumatic temperature sensor system for detecting seal leaks. Upon detection of a seal leak, a pressure signal is generated. This pressure signal is transmitted through a pneumatic line connecting the temperature sensor to a means for controlling the pump in response to the pressure signal. Alternatively, the pressure signal may be used for giving an alarm. A particular application of this invention is with still reboiler pumps in natural gasoline plants. Such pumps are used to pump oil of about 140 molecular weight at 520° F. In case of a mechanical seal failure, there is a rapid leaking of the oil, most of which vaporizes. For example, a calculated adiabatic flash of a 142 molecular weight oil from 175 psia and 520° F. to 15 psia showed the resulting temperature to be 358° F. and the vaporization to be about 94 percent. Thus, in case of a seal failure the vaporized oil is easily ignitable and the fire hazard is great.

Referring now to the drawing, there is shown a pump 1 powered by a driver 3 through a pump shaft 5. A seal gland 7 surrounds shaft 5 and allows action of shaft 5 while maintaining a fluid seal. A pneumatic temperature sensor system 9 is used in combination with pump 1 to sense or detect leakage caused by failure of seal gland 7 and to shut off the pump or to give an alarm in case of leakage.

This system comprises a temperature sensor 9 positioned adjacent seal gland 7 and a pneumatic line 2 connecting temperature sensor 9 with a unit 14 such as an alarm or shutdown unit for controlling the pump. Temperature sensor 9 may be a high temperature valve, for example, an Amot model 4075B High Temperature Valve available from Amot Controls Corporation, Richmond, California. The system is normally activated by applying instrument air or gas through a line 11 to a pressure regulating valve 13 and then to a unit 14. The system is pressurized at all times with a constant pressure from a pressure reducing regulator 13. Temperature sensor 9 has an adjustable set point (control point) of 200° to 500° F. which allows the size of the leak to which it will respond to be regulated. It is normally closed and holds the system pressure. In case of a substantial seal leak the hot oil flashing up shaft 5 will heat temperature sensor 9 which, when it reaches its set point, will open and vent the system pressure to the atmosphere. The loss of pressure produces a pressure signal which activates unit 14. Unit 14 is a system, responsive to a pressure signal, for carrying out such functions as shutting down pump 3 or giving an alarm. Unit 14 may include a manual reset valve 15, indicating relay 17, electric pressure switch 16, and pneumatic relay 8, all pneumatically connected through lines 4, 6, and 10 with line 2. A pressure signal produced by temperature sensor 9 results in an electric signal being produced by electric pressure switch 16 which is transmitted through conductor 21 to electric motor starter 23 and then through cable 25 and shuts off driver 3. A second pneumatic signal is also generated by pneumatic relay 8 and transmitted through line 27 to a pneumatic operator 29 and closes valve 31. Manual reset valve 15 ensures that the system will not reset itself after a failure and thus prevents a restart of pump 1 without knowing that a seal failure has occurred. Indicating relay 17 indicates that the system has produced a shutdown of pump 1.

The temperature sensor 9 may be selected with any desired temperature set point or control point. When used with hot oil pumps at gasoline plants, the set point of temperature sensor 9 should be within the range of 200° to 500° F. and preferably 200° to 300° F. The set point must be sufficiently above ambient temperature such that it is only reached in case of a leak of hot fluids, but in order to provide fast response should be maintained as near this point as possible. The leakage of hot fluids through seal 7 exposes temperature sensor 9 to a temperature equal to or greater than its set point and temperature sensor 9 is tripped, causing a reduction of the pressure in tubing 2. This reduced pressure is detected by a pneumatic or electrical instrument which operates switch means 16 to produce a signal, which signal may be used, for example, to give an alarm or to shut down pump 1.

In accordance with an embodiment of this invention, a fail-safe system is provided by utilizing a tubing having a relatively low melting point and locating at least a portion of this tubing within the flow path which would be taken by escaping fluids through seal 7. This flow path in the case of vertical pumps is above seal 7, or with either vertical or horizontal pumps the flow path is normally in a direction parallel to and in the vicinity of shaft 5. The tubing must have a melting point above ambient temperature but sufficiently low that it will be melted by escaping fluids from the pump. An example of such a tubing is a polyethylene plastic tubing which melts within the range of 250° to 300° F. Thus, leaking fluids will be sensed by the temperature sensor 9 and will also melt tubing 2 in the path of escaping fluids through seal 7. In either or both cases, the pneumatic pressure in tubing 2 is reduced, producing a pressure signal.

What is claimed is:

1. A system for detecting leaks of fluid from a hot fluid pump having a shaft passing through a fluid pump seal, the combination comprising:
    a pneumatic temperature sensor for producing a pressure signal in response to a specified temperature, said pneumatic temperature sensor being located adjacent and exteriorly of said seal and in a position to detect leaks of fluid through said seal;
    means for controlling said pump in response to said pressure signal; and
    a pneumatic line connecting said temperature sensor with said means for controlling said pump.

2. A system for detecting leaks of fluid from a hot fluid pump having a shaft passing through a fluid pump seal, comprising:
    a pneumatic temperature sensor for producing a pressure signal in response to a specified temperature, said pneumatic temperature sensor being located adjacent and exteriorly of said seal and in a position to detect leaks of fluid through said seal;
    means for generating a signal in response to said pressure signal;
    a pneumatic line connecting said temperature sensor with said means for generating said signal; and
    a prime mover and control means therefor and means connecting said means for generating a signal to said control means to operate said pump.

3. The system of claim 2 wherein said means is a pressure electric switch.

4. The system of claim 2 wherein said means is a pneumatic relay.

5. The apparatus of claim 2 wherein said temperature sensor has a set point temperature within the range of 200° F. to 500° F.

6. The apparatus of claim 5 wherein said set point temperature is within the range of 200° F. to 300° F.

7. The apparatus of claim 6 further comprising locating a portion of said pneumatic line adjacent said shaft, said portion having a melting point within the range of 250° to 300° F.

8. The apparatus of claim 7 wherein said portion is polyethylene tubing.

9. In a plant having a vertical oil pump for pumping hot oil with a shaft passing through a pump seal, the combination comprising:
    a pneumatic temperature sensor for producing a pressure signal in response to a specified temperature within the range of 200° to 300° F., said temperature sensor being located above said seal and in a position to detect leaks of hot oil through said seal;
    an electric pressure switch for generating an electric signal;
    a plastic tubing having a melting point within the range of 250° to 300° F. located above said seal and pneumatically connecting said temperature sensor with said switch and maintaining said switch open with pneumatic pressure whereby an electric signal is generated upon a reduction of said pneumatic pressure by said sensor reaching said specified temperature and by melting of said tubing; and
    a prime mover and control means therefor and means connecting said electric signal to said control means to operate said pump.

10. In a process of pumping hot fluid with a fluid pump having a shaft passing through a fluid pump seal, the steps comprising:
    sensing the temperature adjacent and exteriorly of said seal with a pneumatic temperature sensor;
    producing a pressure signal in response to said temperature sensor being exposed to a predetermined temperature;
    transmitting said pressure signal through a pneumatic line connecting said temperature sensor with an electric pressure switch;
    generating an electric signal with said switch in response to said pressure signal; and
    transmitting said electric signal through an electrical conductor to a prime mover and control means therefor, said prime mover being connected with said pump whereby said prime mover is operated in response to said electric signal.

11. The process of claim 10 wherein said predetermined temperature is within the range of 200° to 500° F.

12. The process of claim 11 wherein said predetermined temperature is within the range of 200° to 300° F.

13. A system for detecting leaks of fluid from a hot fluid pump having a shaft passing through a fluid pump seal, the combination comprising:
    a pneumatic temperature sensor having a set point within the range of 200° to 300° F. and being pressurized with gas to produce a pressure signal in response to a specified temperature, said pneumatic temperature sensor being located adjacent and exteriorly of said seal and in a position to detect leaks of fluid through said seal;

means for generating a signal in response to said pressure signal;

a pneumatic line pressurized with gas connecting said pneumatic temperature sensor with said means for generating a signal, said pneumatic line having a portion thereof which has a melting point within the range of 250° to 300° F., said portion of said pneumatic line being located adjacent said shaft and within the flow path of fluids leaking through said pump seal; and a prime mover and control means therefor and means connecting said means for generating a signal to said control means to operate said pump.

* * * * *